(No Model.)
E. K. HUM.
LIGHTNING ROD BALL.
No. 492,512. Patented Feb. 28, 1893.
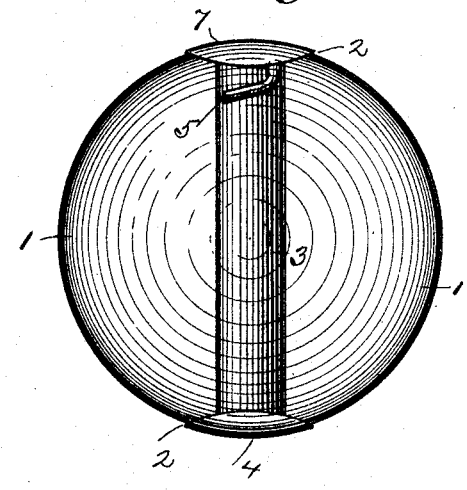
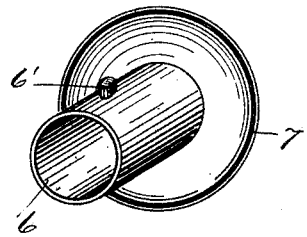
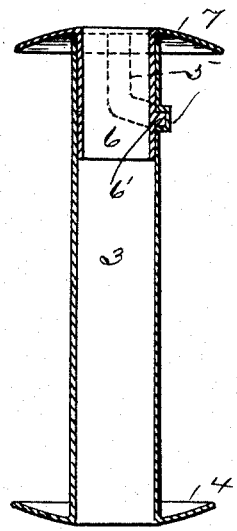
Witnesses:
J H Beal
M E Harrison
Inventor:
Edward K. Hum,
by his Attorney,
Wm L. Pierce

United States Patent Office.

EDWARD K. HUM, OF PITTSBURG, PENNSYLVANIA.

LIGHTNING-ROD BALL.

SPECIFICATION forming part of Letters Patent No. 492,512, dated February 28, 1893.

Application filed September 24, 1892. Serial No. 446,748. (No model.)

*To all whom it may concern:*

Be it known that I, EDWARD K. HUM, a citizen of the United States, residing at Pittsburg, in the county of Allegheny and State of Pennsylvania, have invented or discovered new and useful Improvements in Lightning-Rod Balls, of which the following is a specification.

In the accompanying drawings which make part of this specification, Figure 1, is a side elevation of the glass ball showing the tube through the same. Fig. 2, is a vertical central section of Fig. 1 and Fig. 3, a perspective of the locking cap.

The purposes of my invention generally stated are to devise a cheap and efficient method of connecting the tube to the glass ball for use on lightning rods and a connection which may preserve the true spherical form of the ball.

In the accompanying drawings which make part of this specification, 1, is a hollow blown glass ball, having the usual diametrically opposite openings 2, 2. The usual flanges around said openings have been ground off, leaving the ball a true sphere.

3, is a tube preferably of metal and of a length substantially that of the ball's diameter, and of a diameter the same as the openings 2, 2. Said tube 3, has at one end a flange 4 curved to neatly fit over the outer surface of the ball around one of the openings 2. The other end of said tube has a short length of female thread 5 pressed therein.

The locking cap is a short length of tube 6 of a diameter to make a neat fit inside of the tube 3 and provided with a spur 6 to lock in the thread 5.

7 is a flange similar to flange 4.

The parts are put together by thrusting tube 3 into one of the openings 2 and screwing the locking cap into said tube 3. As the flanges are of thin metal and neatly fit the exterior of the ball, its spherical shape is not broken, and the parts are put together with much less labor than required for the ordinary balls in use and are also cheaper to manufacture. As the balls are sold in enormous quantities, a slight saving in cost is of great importance. If desired any shape may be given to the flanges 4 and 7, and they may be used with glass balls having the projecting glass flanges around the openings 2, 2. The true spherical form of the ball would be lost by this last feature.

Having described my invention, I claim—

1. The combination of a hollow glass lightning rod ball, a tube to be inserted therein provided with a spherically curved flange at one end and a screw connection at the other, and a locking cap having a spherically curved flange at one end and a screw connection at the other end adapted to be locked to said tube, substantially as described and shown.

2. The combination of a hollow glass lightning rod ball, a tube to be inserted therein, provided with a flange at one end and a screw connection at the other, and a locking cap having a flange at one end and a screw connection at the other, adapted to be locked to said tube, substantially as described and shown.

3. The combination of a hollow glass lightning rod ball, a tube to be inserted therein, provided with a flange at one end and a female screw thread at the other, and a locking cap having a flange at one end and a spur at or near the other end to be locked in said female thread, substantially as described and shown.

4. A hollow glass lightning rod ball of true spherical shape, and a tube in two pieces to be inserted in said ball and locked together and having flanges bearing against the exterior of said ball, substantially as described and shown.

In testimony whereof I have hereunto set my hand this 19th day of September, A. D. 1892.

EDWARD K. HUM.

Witnesses:
WM. L. PIERCE,
WILLIAM BEAL.